UNITED STATES PATENT OFFICE.

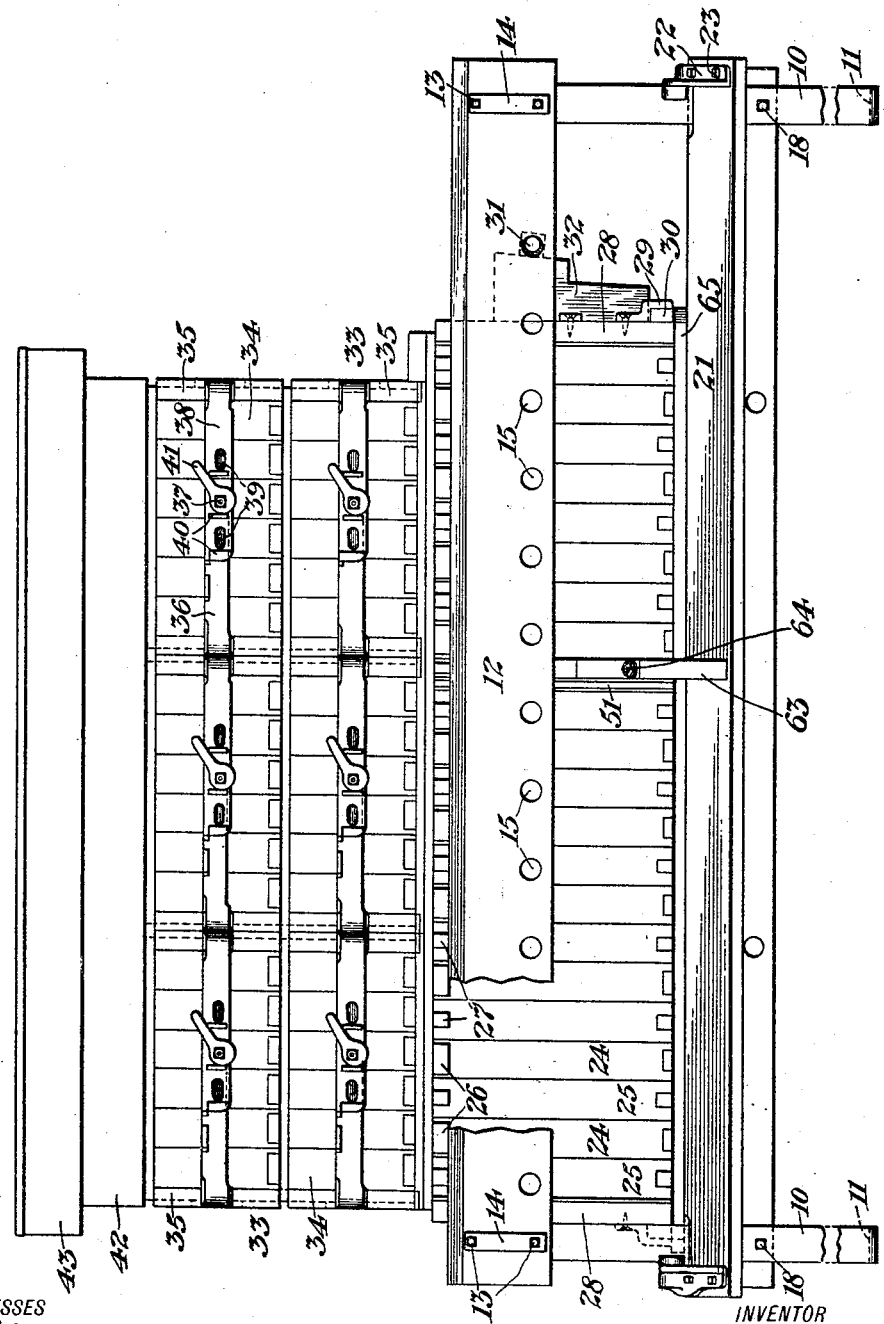

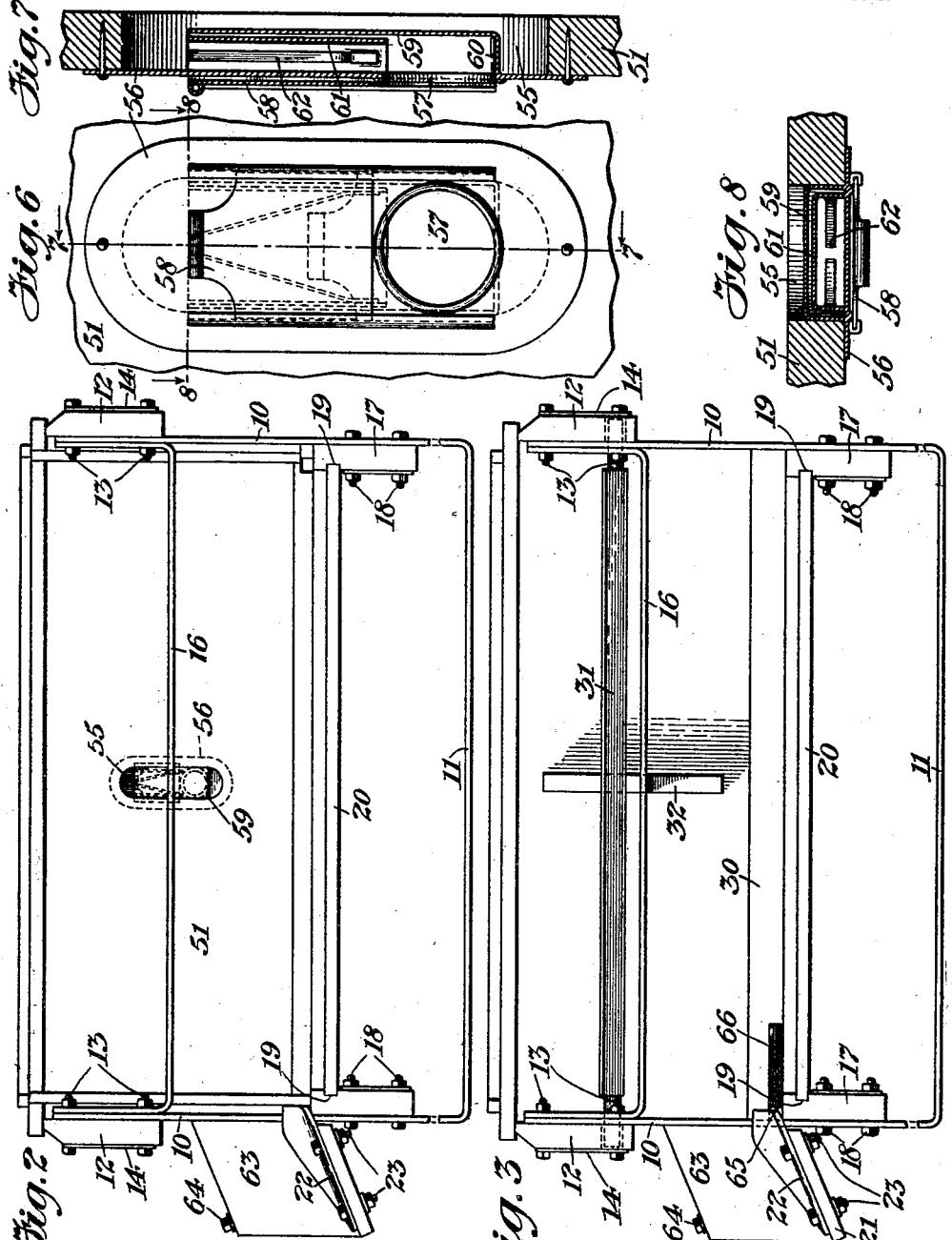

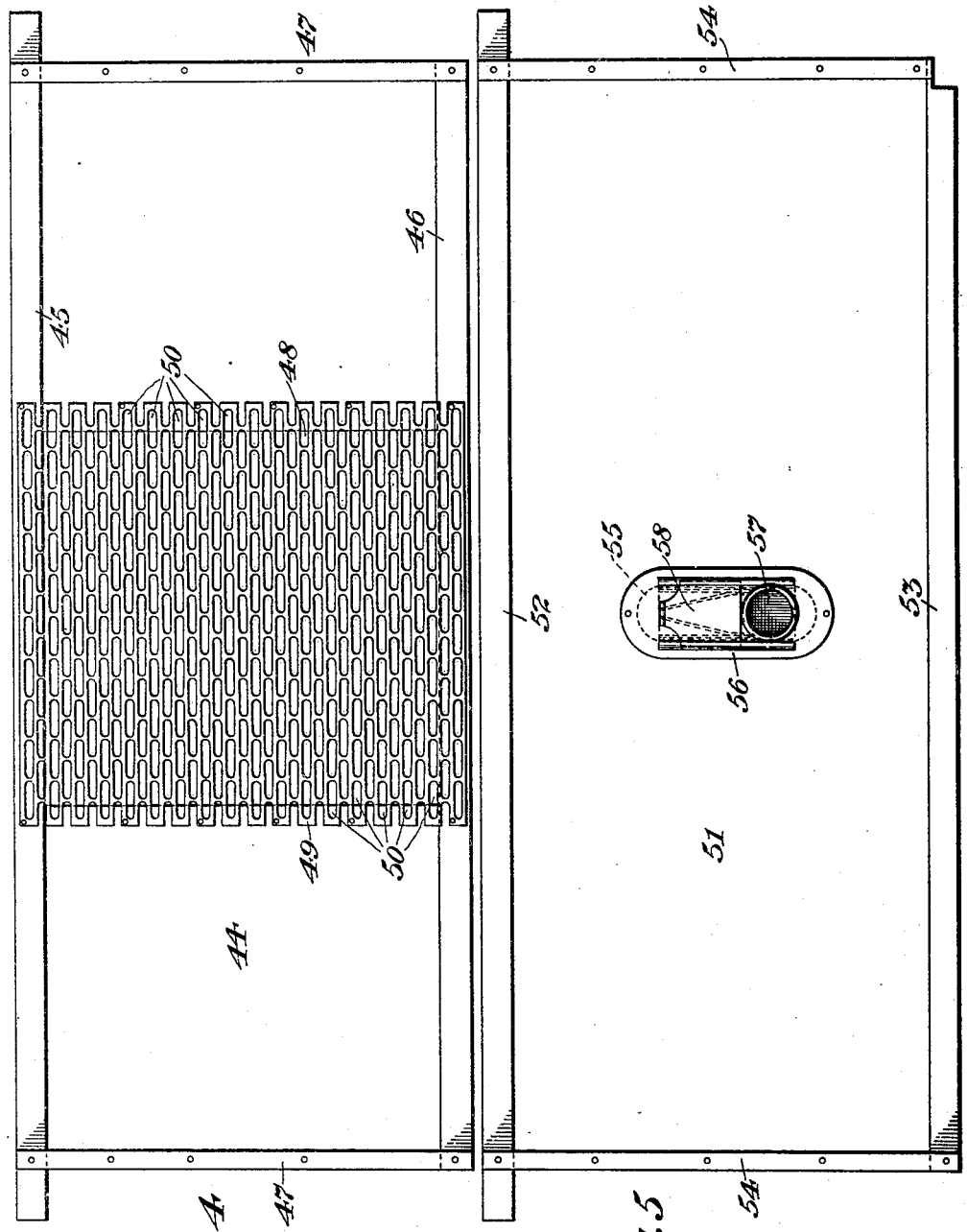

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

BEEHIVE.

1,198,811.     Specification of Letters Patent.     Patented Sept. 19, 1916.

Application filed May 19, 1914. Serial No. 839,477.

*To all whom it may concern:*

Be it known that I, LEWIS AUGUSTUS ASPINWALL, a citizen of the United States, residing at Jackson, in the county of Jackson and State of Michigan, have invented an Improvement in Beehives, of which the following is a specification.

Heretofore, slatted frames alternating with regular comb or brood frames have been employed in bee hives in order to provide passage-ways for the bees at the ends of and around and through the slatted frames to relieve the pressure which occurs in the hive at the time of swarming. The manner of so constructing bee hives is illustrated in Letters Patent, Nos. 891,583, 891,584 and 891,585, granted to me on June 23, 1908, for Letters Patent for bee hives. Bee hives of this type have given very satisfactory results with an average yield of honey. There are certain seasons, however, when the yield of honey is excessive, and during such times it has been found necessary to provide a more efficient bee hive. During such times of excessive yield of honey, the crowded condition of the hive is aggravated by the filling of every cell possible, and also by the lengthening of the same, which further limits the available space within the hive and consequently increases the crowded condition of the bee hive. In order to overcome this, I now provide a bee hive with an overflow or auxiliary compartment, stocked with a portion of the combs containing eggs, larva, and honey, this overflow compartment being formed in the hive by the use of a queen excluder plate, and also a bee escape plate placed in juxtaposition between the main compartment and the overflow compartment of the hive, as will be hereinafter more particularly set forth in connection with the description of the construction and the use of the bee hive made in accordance with my present invention.

Referring to the drawing, Figure 1 is a front elevation of a bee hive made in accordance with my present invention. Fig. 2 is a partial end elevation of the same, omitting the supers for economy in space. Fig. 3 is a view similar to Fig. 2, illustrating the entrance after the overflow compartment has been utilized for the nucleus of a new colony of bees. Fig. 4 is an elevation of the queen excluder board. Fig. 5 is an elevation of the bee escape board. Fig. 6 is an enlarged elevation of the bee escape. Fig. 7 is a section on line 7, 7, Fig. 6, and Fig. 8 is a section on line 8, 8, Fig. 6.

Referring to the drawing, my improved bee hive preferably comprises corner posts or uprights, indicated at 10, connected at their lower extremities by a cross bar 11, which may be integral therewith or suitably connected thereto, and which, as will be understood, form a base or support for the bee hive.

Suitably connected to the posts 10, at the upper ends thereof, and on their outer faces, are the upper longitudinal rails 12. As illustrated in the drawing, these rails are connected to the posts by bolts 13, and on their outer surfaces cleats 14 are provided, through which the bolts pass, and against which the heads of the bolts bear. These upper longitudinal rails, in similar positions, are provided with series of apertures 15 to receive the lock bar, hereinafter described, as is customary in this art.

Extending between each pair of the corner posts 10, at approximately the lower edges of the upper longitudinal rails 12, is a strap 16. This is preferably U-shaped, and the ends thereof bear against the inner surfaces of the corner posts and are connected thereto by the bolts 13, which, as hereinbefore described, also secure the upper longitudinal rails in position. Also connected to the corner posts are lower longitudinal rails 17. These preferably are secured against the inner surfaces of the corner posts and are connected thereto by the bolts 18, or otherwise. In their inner surfaces, adjacent the upper edges, these lower longitudinal rails are provided with grooves or recesses 19, to receive the correspondingly grooved or recessed ends of the bottom board 20, which form the bottom of the bee hive.

Suitably connected at one side of the hive is an alighting board 21. As illustrated in the drawing, this alighting board, at its ends, is provided with brackets 22, which are connected thereto by bolts 23, and the brackets 22 are so constructed as to engage the corner posts 10 to secure the alighting board in position.

I also employ a series of comb or brood frames 24, and a series of intermediate slatted or dummy frames 25. The top bars 26 of the comb frames are sufficiently long to extend over the upper longitudinal rails by which the brood frames are supported, and similarly the top bars 27 of the slatted frames 25 extend over the upper longitudinal rails 12, in order to support the slatted frames in position.

At their respective ends, I provide the bee hive with closing boards 28. These are fitted with brackets 29 to maintain the closing strips 30 in position. I also employ a lock bar 31, which is preferably square in cross section, and the ends of which are turned cylindrical in order to pass through the apertures 15 provided therefor in the upper longitudinal rails 12.

I also employ a wedge member 32, which co-acting with the lock bar 31, maintains the end members, together with the intermediate alternating comb frames and slatted frames, in position. As shown in this instance, the wedge member 32 is preferably stepped on one side thereof, and the number of pairs of apertures 15, in the upper longitudinal rails, is materially decreased, the wedge, it will be understood, being so stepped as to make it possible to fit in the required number of brood and slatted frames within the bee hive.

As shown in Fig. 1, and as is also customary, I employ a series of preferably tiered supers 33. Each of these comprises suitable frames or holders 34 for the honey combs, and suitable end members 35, between which, on opposite sides, there are connected strap bars 36 and 38. As shown in Letters Patent, No. 1,004,335, granted September 26, 1911, to the Aspinwall Manufacturing Company, as my assignee, each of these supers is provided on its opposite sides with a pair of strap bars, which are connected at their distant ends in the end members of the supers. The adjacent ends of these strap bars overlap one another, and the strap bar 36 is provided with a lug 37 and the strap bar 38 with a series of recesses 39 and intermediate ribs 40. The lug 37 is adapted to fit within any of the recesses 39 and by the employment of an eccentric lever 41, fitting over the lug 37 and bearing against one of the ribs 40, the end members of the super may be clamped together to hold in position the frames between them.

Above the supers 33, I prefer to employ a tray 42, the bottom of which is covered with muslin or other suitable material, and the tray filled or partially filled with shavings or other equivalent material, and above the tray 42 is a cover 43, the tray and cover being employed, as will be understood, in order to maintain the necessary warmth within the bee hive during the period of comb building, when the weather is cool, particularly at nights, and also to maintain the required temperature within the bee hive during the middle of the day when the weather is extremely warm.

The features of the bee hive, as hereinbefore described, are merely those which are disclosed in the Letters Patent to which reference has hereinbefore been made. Together with these parts, I also employ a queen excluder board, shown in Fig. 4, in which the same is indicated at 44. This is provided with a top rail 45, a bottom rail 46, and end rails 47, the top rail 45 extending beyond the ends of the board so as to fit over the tops of the longitudinal rails 12, in order to maintain the board in position within the bee hive. Centrally, this queen excluder board is apertured, as indicated at 48, and this aperture is covered by a zinc plate 49, in which there is a plurality of elongated holes 50, each of which is sufficiently wide to permit the worker bees to pass and re-pass, but which are too narrow to permit queens and drones to either pass or re-pass. As illustrated in the drawing, this zinc plate is nailed to one side of the queen excluder board, but as will be understood, the same may be suitably connected thereto in any desired manner.

I also employ a bee escape board, indicated at 51, in Fig. 5. This board is also provided with a top rail 52, a bottom rail 53, and end rails 54, the top rail 52 extending beyond the ends of the board in order to rest upon the upper longitudinal rails 12 to maintain the bee escape board in position in the bee hive.

In a suitable position, preferably centrally, the bee escape board 51 is provided with an opening 55. On one side, this opening 55 is covered by a plate 56, which is suitably secured to the board. The plate 56 is provided with an entrance aperture 57, and may be fitted with a suitable sliding door 58, by which, when desired, the entrance aperture 57 may be closed.

Within the opening 55, the bee escape includes a U-shaped frame 59, which is closed at one end, as indicated at 60, and is open at the opposite end. As illustrated, and as particularly shown in Fig. 7, this U-shape frame may be made integral with the plate 56, but, as will be understood, instead of being so made, it may be suitably connected thereto.

Within the U-shaped frame 59 is a spring support frame 61, to which are suitably connected the springs 62, which complete the bee escape. I also employ a divider board 63, shown in Fig. 1, and which may be suitably connected to the alighting board by means of a bolt 64, or otherwise, and the use of which will be hereinafter described.

Also, as shown particularly in Figs. 1 and 3, I employ a closing strip 65, to shut off the entrance at the front to the overflow compartment, after provision has been made for the nucleus colony, as will be hereinafter described, and in which instance, as is also shown in Fig. 3, the closing strip, at this end of the bee hive, is provided with an aperture 66, through which the bees may leave and enter the overflow compartment.

In the use of the hereinbefore described bee hive, I prefer to employ ten comb frames prior to such time as the slatted frames may be introduced. When necessary to make arrangements for an overflow from the main compartment to the overflow compartment, preferably six of these comb frames and seven intermediate slatted frames are employed in the main compartment or that occupied by the parent colony, thereby leaving four brood frames in the overflow compartment to form the nucleus colony, the main and overflow compartment being separated by the queen excluder board, and the bee escape board, which are placed in a juxtaposed position between the compartments with the queen excluder board next the main compartment and the bee escape board next the overflow compartment. In so arranging the bee hive, the division board 63 is bolted to the alighting board in such a position as to form a substantial continuation of the queen excluder board and the bee escape board, as is clearly indicated in Fig. 1.

As hereinbefore stated, the apertures in the zinc plate attached to the queen excluder board are of sufficient size to permit the worker bees to pass and re-pass but to prevent the queen and drones from so doing.

It will be understood, by reference to Figs. 2, 5, 6, 7 and 8, that when the worker bees pass through apertures in the queen excluder board, into the space between this board and the bee escape board, they may also pass through the entrance aperture 57 into the space between the plate 56 and the U-shaped frame 59, and they may also pass upwardly or outwardly, depending upon the position of these members, through or between the springs 62, into the opening 55 in the bee escape board, and thence into the overflow compartment.

It will be equally manifest, in view of the position of the springs 62, as illustrated in the drawing, that the bees, having passed through this bee escape, cannot return therethrough. Inasmuch, therefore, as no bees return through the bee escape, the nucleus colony in the overflow compartment becomes heavily stocked with nurse bees, and consequently becomes productive of a number of fine queen cells. Furthermore, inasmuch as these nurse bees take but few flights, the overflow compartment becomes crowded, thereby providing a superabundance of larval food which is of the utmost importance in the production of large and vigorous queens.

As will be understood, if the overflow compartment is completely isolated, by closing the entrance aperture 57 by means of the sliding door 58, or otherwise, the destruction of the prospective young queen, by the passage of the bees from the parent colony, will be prevented, it being understood that although bees will construct queen cells under such circumstances, they are also likely to destroy a young queen where there is a small passageway connecting adjoining compartments. After the nucleus colony has been isolated, in this manner, at the end of ten days all but one of the queen cells are removed, so that the then maturing queen may become the mother of the nucleus colony. It will also be understood, by particular reference to Figs. 1 and 3, that by employing the divider board 63 and the front closing strip 65, together with the slot 66, in the end closing strip, the bees in the nucleus colony may mark the location separately from the parent colony in the main compartment, and this enables the young queen to become mated and return in safety to the nucleus colony. Now, as will also be understood, when the queen in the nucleus colony begins to lay eggs in the comb cells, the slatted frames are also introduced in the nucleus colony, alternating with the brood combs, as in the parent colony in the main compartment, and for a similar purpose. Furthermore, after the queen has occupied the comb frames for a time, and a portion of the brood is maturing, the bee escape may then be safely opened for the excess of bees from the parent colony, as under such circumstances the life of a laying queen is respected. Inasmuch as there is now a young queen in the overflow compartment, and as the nurse bees are those which pass through the bee escape, but few of them return to the parent colony, these being the youngest bees and most of them having made no flights.

The few bees which do return to the parent colony, have no swarming impulse and maintain the same tendency in the parent colony, which is obviously considerably less crowded than where no overflow compartment is provided. Then again, the nurse bees being separated from the parent colony leave the field bees greatly in excess of the normal proportion, placing the colony where an increase of nurse bees from the maturing brood becomes necessary before any preparations for swarming can be made. Furthermore, as will be understood, the spacing in the overflow compartment adds at least a third to the capacity of the hive, after the slatted frames have been placed in position therein, and as also will be understood, the addition of the overflow compartment also increases the capacity of the supers in a like degree, and this arrangement has thus far entirely overcome any tendency of the bees to swarm.

In addition to the advantages of a bee hive for preventing the bees from swarming, as hereinbefore described, another important result is obtained in the use of my present bee hive, which is the rearing of queens for commercial purposes. It will also be understood that while I have herein shown and described but a single overflow compartment, that any number of the same may be employed and arranged in any desirable relationship to the main compartment occupied by the parent colony. I wish also to state that neither the bee escape, as hereinbefore described, nor the queen excluder are of themselves new in this art, but as employed by me in the bee hive hereinbefore described are the means of causing a bee hive so constructed to be a material advance in the art. Still furthermore, it will be understood that one or more overflow compartments, as hereinbefore described, may be used in connection with an ordinary commercial bee hive, and when so used the crowded condition of the colony is lessened and swarming retarded and even prevented under some circumstances in the ordinary form of hives.

I claim as my invention:

A bee hive comprising means for supporting frame units, a queen bee excluder board, a juxtaposed bee escape board, said queen bee excluder board and juxtaposed bee escape board separating predetermined frame units into a main brood chamber and an auxiliary or a nucleus chamber, the supporting means in the main brood chamber permitting the insertion of slatted frames between each two frame units in the main brood chamber, and means for maintaining said frame units and slatted frames in position in the hive.

Signed by me this 13th day of May, 1914.

LEWIS AUGUSTUS ASPINWALL.

Witnesses:
C. G. ROWLEY,
GEO. N. WHITNEY.